Jan. 13, 1959     B. SKINNER     2,868,696
DISTILLATION OF HEAT SENSITIVE COMPOUNDS
Filed Aug. 18, 1952     2 Sheets-Sheet 1

*INVENTOR.*
BRADLEY SKINNER
BY Hudson and Young
ATTORNEYS

Jan. 13, 1959  B. SKINNER  2,868,696
DISTILLATION OF HEAT SENSITIVE COMPOUNDS
Filed Aug. 18, 1952  2 Sheets-Sheet 2
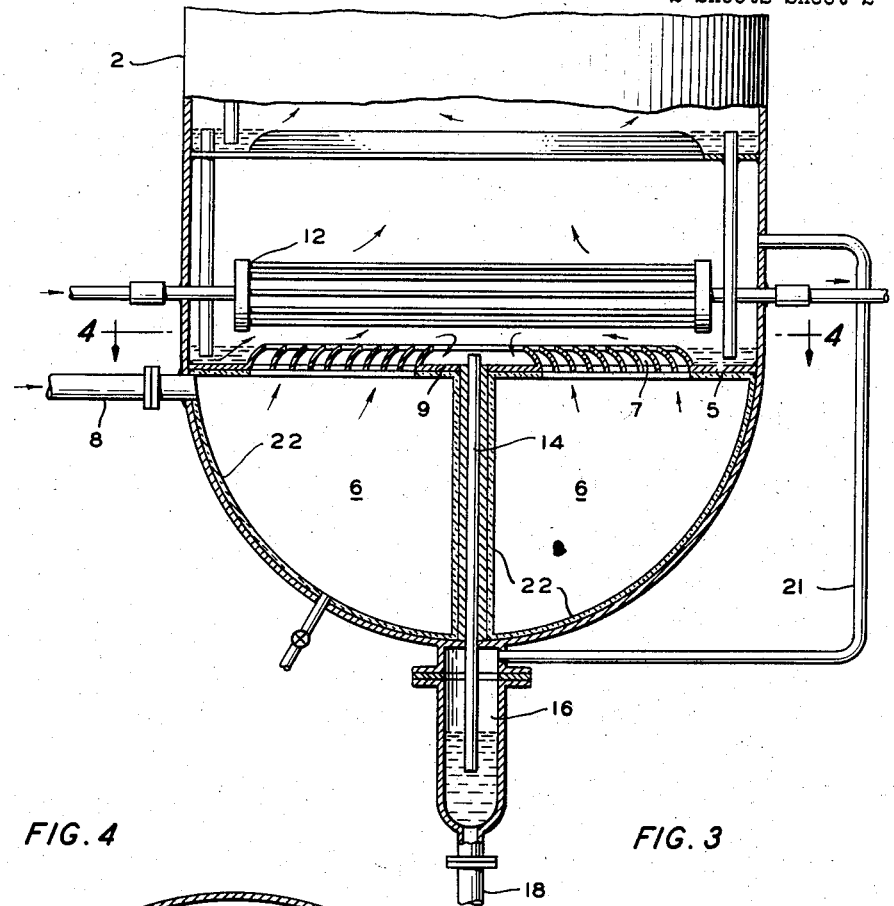
FIG. 4
FIG. 3
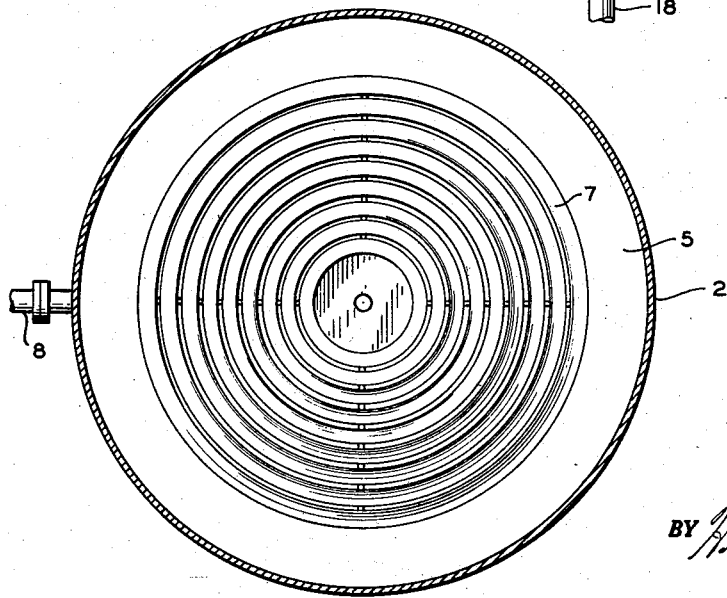
INVENTOR.
BRADLEY SKINNER
BY Hudson and Young
ATTORNEYS United States Patent Office 2,868,696
Patented Jan. 13, 1959

2,868,696

DISTILLATION OF HEAT SENSITIVE COMPOUNDS

Bradley Skinner, Bartlesville, Okla., assignor to Phillips Petroleum Company, a corporation of Delaware Application August 18, 1952, Serial No. 305,060

8 Claims. (Cl. 202—39)

This invention relates to the distillation of closely boiling compounds difficultly separable because at least one of the compounds is sensitive to heat. In another of its aspects this invention pertains to the purification by distillation of compounds which are highly susceptible to polymerization, cracking, depolymerization, etc. In a further aspect the invention pertains to means for distilling vinyl organic compounds.

This invention is particularly applicable to vinylpyridine compounds. It is known that difficulties are encountered in the manufacture of vinylpyridine compounds because of the tendency of vinylpyridines to polymerize upon exposure to elevated temperatures. Thus difficulty is generally encountered in purifying vinylpyridine compounds by distillation due to their susceptibility to polymerization. Especially difficult to separate by distillation are 2-methyl-5-vinylpyridine and 2-methyl-5-ethylpyridine. Separation of these compounds by distillation is difficult for many reasons. For example, because of the difference of 13° F. at atmospheric pressures in their boiling points separation by vacuum distillation is difficult because of the large number of trays required. Further high vacuum distillation is not feasible because of considerable pressure drop across the large number of trays. Inhibition of polymerization of 2-methyl-5-vinylpyridine, however, requires operation at low temperatures.

I have found that 2-methyl-5-vinylpyridine and 2-methyl-5-ethylpyridine can be separated without encountering many of the difficulties such as those mentioned above. It is understood however that the means provided herein apply equally well to other compounds susceptible to polymerizing, cracking, or otherwise disintegrating due to heat. Thus the invention is applicable to hydrocarbon oils where it is desirable to avoid overheating the oils to be distilled or to distill without cracking, oil which tends to disintegrate when heated. The process of my invention is also applicable to hydrocarbon mixtures consisting of a substantial proportion of styrene or other vinyl aromatic hydrocarbon, together with at least one other aromatic hydrocarbon. Examples of such other aromatic hydrocarbons are benzene, toluene, ethyl benzene, isopropyl benzene, diethyl benzene, allyl benzene, phenyl acetylene, naphthalene, etc. The vinyl aromatic hydrocarbon-aromatic hydrocarbon mixtures treated in our process may be preformed mixtures or may be derived from any suitable source, e. g. by pyrolysis of ethyl benzene or isopropyl benzene, by the destructive distillation of storax, etc. Other polymerizable heterocyclic nitrogen compounds, also within the scope of this invention, are vinyl and alpha-methylvinyl substituted heterocyclic nitrogen compounds in which the ring structure is unsaturated, partially saturated and completely saturated. Examples include vinyl and alpha-ethylvinyl substituted quinolines, isoquinolines, piperidines (hexahydropyridines), pyrroles, pyrrolidines, pyrrolidones, especially the vinyl-substituted pyrrolidones, piperidines, pyrroles, pyrrolidines, quinolines, isoquinolines, and alkyl derivatives of the foregoing compounds, dihydro and tetrahydropyridines, partially hydrogenated quinolines and isoquinolines, and pyrrolines (dihydropyrroles).

One method of separating methylethylpyridine from methylvinylpyridine is to use a nine foot diameter tray-type fractionator. This fractionator is a combination steam-vacuum unit. Overhead product passes to a phase separator where water and methylethylpyridine are separated. The methylvinylpyridine bottoms product is passed to a stripper and finishing still.

In accordance with an embodiment of this invention the separation or purification of a mixture of compounds wherein one compound is susceptible to polymerization is achieved by conducting said mixture into a steam-vacuum distillation column, agitating liquid falling on the bottom tray of said column by passing diluent steam through said liquid at a rate sufficient to form a frothy layer, indirectly heat exchanging steam with said froth immediately above the bottom tray as the froth layer rises, thereby preventing the accumulation of a liquid bed on said bottom tray, and withdrawing kettle product from a quiescent zone in the center of said bottom tray.

In one of its broader aspects heat sensitive compounds are distilled in a fractionation column by passing a diluent gas through the bottom tray of the distillation column to drive substantially all of the mixture upward, vaporizing a major portion of said mixture by heat supplied by indirect heat exchange immediately above said bottom tray, and collecting unvaporized material at the center of said bottom tray.

The accompanying drawings illustrate two of the various forms of apparatus which can be employed in practicing the invention.

Figure 3 is also the bottom portion of a distillation column showing a different type of bottom tray.

Figure 4 is a top view of a section the bottom of the column shown in Figure 3 taken through 4—4 and showing the tray 5.

Figure 1:
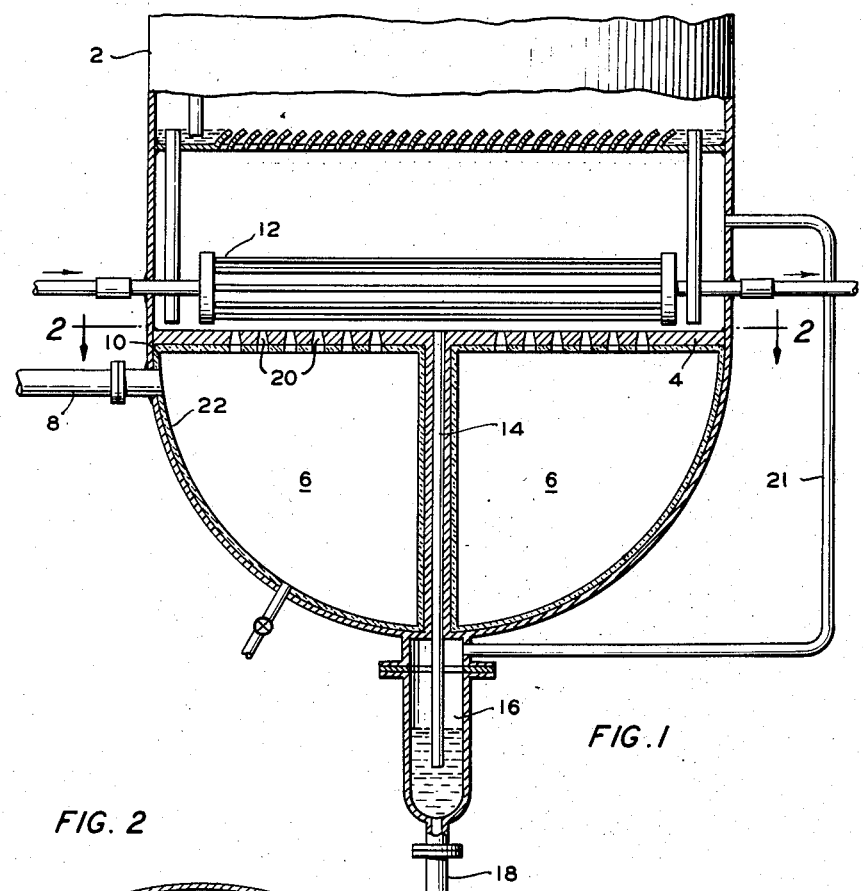
Figure 1 is the bottom portion, partly in section, of a distillation column wherein the separation of heat sensitive compounds takes place.

Referring now to Figure 1, numeral 2 designates a fractionation column, normally a vacuum distillation column. The upper portion of this column is conventional and has not been shown in the drawing. The bottom tray 4 is a liquid-gas contacting plate. Gases enter zone 6 through inlet 8 and pass through tray 4 as will be described hereinafter. Tray 4 is insulated as shown at 10 to prevent indirect heat transfer to the liquid on the tray. Reboiler coils, shown at 12 as a tube bundle, are located slightly above tray 4 as will be discussed hereinafter. A downcomer 14 in the middle portion of tray 4 leads to a manometric trap 16 from which kettle product is withdrawn through line 18. Line 21 serves to equalize the pressure in the zone immediately above tray 4 and in trap 16.

Figure 2:
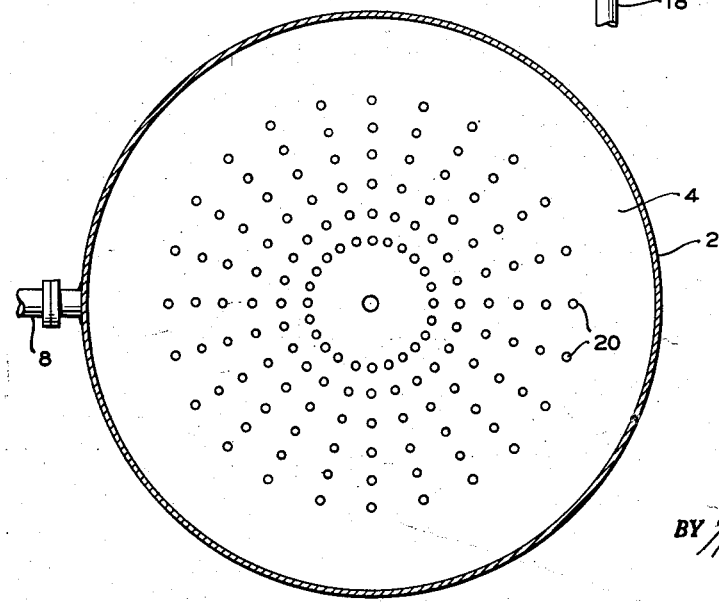
Figure 2 is a top view of a section of the column shown in Figure 1, taken through 2—2 and showing tray 4.

In Figure 2 is shown one embodiment of tray 4. In this embodiment the liquid-gas contacting tray is in the form of an insulated plate having a multiplicity of orifices or perforations 20 therein. The perforated plate 4 can be replaced by circular tray 5, shown in Figures 3 and 4, having as its center portion a plurality of concentric annular rings extending upwardly and inwardly and spaced to form a series narrow annular flow passages therebetween. Said annular flow passages formed by the concentric rings have been called venturis. As shown in Figures 3 and 4 the venturis 7 are pointed toward the center of the tray so that liquid is urged toward a downcorner 14 in the center of tray 5. Another form of venturi tray which can be adjusted for use in this invention is the so called "Koch Benturi" or bent venturi tray.

In Figure 3 the remaining elements are numbered as in Figure 1 for the sake of clarity. Numeral 2 designates a distillation column adapted so that gases enter zone 6 through line 8. Tray 5 is insulated as shown at 9 and reboiler tube bundle 12 is located just above tray 5. The column is similarly adapted with a manometric trap 16 from which kettle product is withdrawn through line 18. As in the embodiment of Figure 1 line 21 serves to equalize the pressure in the zone immediately above tray 4 and in trap 16.

The operation of my process can perhaps be better understood by describing the separation of ethyl and vinyl pyridines. A methylvinylpyridine stream containing methylethylpyridine and other by-products is introduced into column 2 about half way up the column (at a point not shown in the drawing). The bottom tray of the column, is shown as 4 in Figure 1 and as 5 in Figure 3. Liquid from the tray above, not shown, which flows to the bottom tray is partially vaporized when superheated steam is used and the remaining liquid is frothed on tray 4 or 5. Part of the froth will be vaporized either by the reboiler 12 or by the reboiler and superheated steam, and part of the froth will settle back on the tray. The froth is obtained by diluent steam or other inert gas passing through bent venturis 7 or orifices 20. The steam or other diluent gas enters zone 6 through line 8. The velocity of the steam is such that as it rises through the bottom tray the accumulated liquid layer is violently agitated to a froth. The rate of steam introduction sufficient to form a froth layer will vary somewhat with the substances being fractionated depending upon conditions used for the particular separation. In the case of methylvinyl and methylethyl pyridine separations this velocity can be from 80 to 110 feet per second. A reboiler element 12 is located immediately above the bottom tray so as to be in contact with the froth produced by the diluent steam. As the liquid on the tray is agitated, the froth layer surrounds and picks up additional heat from the reboiler tube bundle 12. Steam or other heating material passes through tube bundle 12 as shown by the arrows. Kettle product flows from a quiescent zone, usually in the middle portion of the tray, through insulated line 14 leading to a manometric trap 16 from which it is withdrawn through line 18. As indicated, line 21 serves to equalize the pressure in trap 16 and in the lower portion of the column. It will be noted also that the kettle product and the liquid on the tray are protected from the heat in zone 6 by insulation 22.

When saturated steam is used, as the steam passes through the tray, the liquid thereon is agitated to a froth and the steam provides sufficient heat to maintain the fluid at its boiling point under operating conditions. At the same time heat is supplied by reboiler tube bundle 12 and the frothy material is instantaneously vaporized so that it can not polymerize. Since material tending to accumulate on the tray is agitated to a froth in accordance with this invention the vaporization temperature at the bottom of the froth layer will not differ materially from the vaporization temperature at the top of the froth layer under operating conditions; this would not be the case if instead a layer of liquid accumulated on the tray and covered the reboiler. Because of the partial pressure due to steam, particularly at low absolute pressures, the vaporization temperature of the fluid on the tray will be lowered, tending to decrease polymerization. By the practice of this invention since there is a froth layer and only a minimum of liquid on the tray, the temperature at the bottom of the liquid layer will be correspondingly lower due to the presence of steam. If a large amount of liquid were to accumulate above the reboiler the vaporization temperature at the bottom of the reboiler would be unaffected by the partial pressure due to steam.

Although saturated steam can be used as described, I prefer that the steam be superheated, or if an inert gas is used, that it be heated to a temperature above that of the temperature of the fluid on the tray, say from 100° F. to 400° F. above the fluid temperature. The superheated steam or hot inert gas thereby not only maintains the fluid on the bottom of the tray in a frothy condition but it also permits direct heat transfer which of course is more efficient. Since the froth is at its boiling point for the conditions employed all of the superheat of the steam is used to vaporize the fluid so that polymerization will not take place. As a result only a small amount, and in some cases none, of the additional heat need be supplied by the reboiler heating tubes.

Thus when operating in accordance with this invention the reboiler temperature is lower than in the conventional process. In addition the reboiler temperature can be further lowered when superheated steam is used in forming the froth layer. The superheated steam will supply a large portion of the heat of reboiling which the reboiler element would normally have to supply. Further since there is a minimum of liquid holdup in the bottom of the column residence time is low. These factors all contribute to decreased polymerization.

The operation of the invention can be further illustrated by the following example applied to the separation of ethyl and vinyl pyridines.

*Example*

From a settling tank a feed stream comprising water, 25 weight percent 2-methyl-5-vinylpyridine, 66 weight percent 2-methyl-5-ethylpyridine, 8 weight percent lower boiling components and 1 weight percent higher boiling components is introduced into a 120 tray fractionating column provided with a reboiler section as shown in Figure 1 or 3. The following are typical of conditions encountered as well as yields, all rates being in moles per stream day:

| | |
|---|---|
| Feed rate | Water, 307.8; organics, 241.9. |
| Steam | 21,073.3. |
| Overhead temperature | 130° F. |
| Column top pressure | 105 mm. absolute. |
| Kettle temperature | 185° F. |
| Kettle pressure | 290 mm. absolute. |
| Velocity through bottom tray | 91 feet per second. |
| Velocity of frothy material between reboiler tubes | 35–80 feet per second. |
| Overhead products water phase | Water, 21,171.2; organics, 36.5. |
| Overhead products, organic phase | Water, 189.0; organics, 149.0. |
| Kettle product | Water, 20.9; 2-methyl-5-vinylpyridine, 56.4. |

Thus it is seen that unlike prior art methods employed in the distillation of polymerizable and other heat sensitive compounds this invention provides an efficient and convenient method for maintaining low liquid temperatures during distillation. In conventional methods of fractionating the reboiler heating elements are covered at all times with liquid being reboiled. When a liquid is being heated which has a tendency to polymerize when exposed to higher temperatures it is advantageous to have little or no liquid layer. As a result the liquid being heated is in contact with the heating elements for a shorter period of time thereby reducing the tendency toward polymerization. The static pressure of the liquid on the bottom tray is reduced by the practice of this invention and as a result of this reduced hydrostatic pressure liquid on the tray will boil at a lower temperature thereby minimizing polymerization. The density of the liquid surrounding the heating element will be reduced because of the bubbles of steam or inert gas rising through the liquid and making the liquid into a froth. When inert gas or steam is used in frothing the liquid on the tray the partial vapor pressures of the materials being separated are reduced which in turn will reduce the boiling point of the liquid on the tray. This decreases the tendency of the liquid to polymerize. Since there is no large body of liquid in the bottom of the column, residence time is low. Moreover the pressure drop across the froth is much lower than that through a corresponding depth of liquid, particularly at low absolute pressures. Thus it is understood that by operation in accordance with this invention numerous advantages are attained aiding in the separation by distillation of heat sensitive compounds.

In the light of the teachings of this invention further modifications and variations will occur to those skilled in the art. For example variations in design, and the addition of reboiler elements above other trays, are within the scope of this invention. Other embodiments can also be made without departing from the spirit and scope thereof.

I claim:

1. A distillation column for the purification of compounds highly susceptible to polymerization which comprises a multiplicity of trays and an improved reboiler section in the bottom thereof which comprises as a bottom tray a circular plate horizontally disposed within said column above the bottom thereof to form a lower region beneath said plate, said plate having a diameter equal to the inside diameter of the column such that it extends across the entire cross section within the column, and said plate having perforations therein throughout substantially the entire area thereof, a conduit communicating with the region beneath said plate to permit the flow of gases to said region from an external source, a tube member passing through said lower region from outside of the column and connected at its upper end to one of the perforations for withdrawing bottoms product said tube member being flush at its upper end with the top surface of said plate, and a plurality of heat exchange tubes within said column and disposed horizontally across the column between the bottom tray and the tray immediately above said bottom tray and closely spaced above said bottom tray, said tubes being in circular arrangement and connected to a vertical circular header at each end, each header having an outlet or an outlet conduit therein.

2. A distillation column for the purification of compounds highly susceptible to polymerization which comprises a multiplicity of trays and an improved reboiler section in the bottom thereof which comprises as a bottom tray a circular plate horizontally disposed within said column above the bottom thereof to form a lower region beneath said plate, said plate having a diameter equal to the inside diameter of the column such that it extends across the entire cross section within the column, and as said bottom tray a circular plate having as its center portion a plurality of concentric annular rings extending upwardly and inwardly and spaced to form a series of narrow annular flow passages therebetween, the tops of said annular rings forming said annular passages forming the top of said bottom tray, a conduit communicating with the region beneath said plate to permit the flow of gases to said region from an external source, a tube member passing through said lower region from outside of the column and connected to a perforation within said plate for withdrawing bottoms product, the top of said tube member being no higher than the top of said tray, and a plurality of heat exchange tubes within said column and disposed horizontally across the column between said bottom tray and a tray immediately above said bottom tray said tubes being in circular arrangement and connected to a vertical circular header at each end, each header having an outlet or an inlet conduit therein.

3. In the distillation of a mixture of compounds containing at least one heat sensitive compound, said distillation being effected in a distillation zone comprising a multiplicity of individual zones and a bottom vapor-liquid contacting zone, the process which comprises passing a diluent gas through the bottom of said vapor-liquid contacting zone of said distillation zone to drive substantially all of the mixture upward, vaporizing a major portion of said mixture by heat supplied by indirect heat exchange immediately above the lower portion of said vapor-liquid contacting zone, and collecting unvaporized material at the bottom of said vapor-liquid contacting zone.

4. In the distillation of heat sensitive compounds in a distillation zone comprising a multiplicity of individual zones and a bottom vapor-liquid contacting zone, the process which comprises agitating to a froth layer liquid falling on the bottom of said vapor-liquid contacting zone by passing steam through said liquid, indirectly heat exchanging steam with said froth in said vapor-liquid contacting zone as the froth layer rises therein thereby minimizing the accumulation of liquid on the bottom of said vapor-liquid contacting zone, and withdrawing kettle product from a quiescent zone at the bottom of said vapor-liquid contacting zone.

5. A process of separating vinylpyridine from alkylpyridines which comprises conducting a mixture of pyridines into a steam-vacuum distillation zone, said distillation zone comprising a multiplicity of individual zones and a bottom vapor-liquid contacting zone, agitating liquid falling on the bottom of said vapor-liquid contacting zone by passing diluent steam through said liquid at a rate sufficient to form a frothy layer, indirectly heat exchanging steam with said froth immediately above the bottom portion of said vapor-liquid contacting zone as the froth layer rises thereby preventing the accumulation of a liquid on the bottom of said vapor-liquid contacting zone, and withdrawing kettle product from a quiescent zone in the central bottom area of said vapor-liquid contacting zone.

6. A distillation column for low temperature and low pressure purification which comprises a multiplicity of trays, a bottom tray and an improved reboiler section in which at least said bottom tray is a foraminous liquid-gas contacting tray, at least one inlet in the column beneath said bottom tray adapted to admit gaseous fluid below said tray, a downcomer connected to an opening in said bottom tray, the top of said downcomer being flush with the upper surface of said bottom tray, and a heat exchange element disposed within said column closely spaced above said bottom tray and between said bottom tray and the tray immediately above said bottom tray whereby in the operation of said distillation column said heat exchange element is adapted to heat a frothy liquid-gaseous material maintained upon said bottom tray.

7. A distillation column for purification of compounds requiring low temperature and low pressure conditions which comprises a multiplicity of trays, a bottom tray and an improved reboiler section which comprises a liquid-gas contacting bottom tray, at least one inlet in the column beneath said bottom tray adapted for the introduction of gaseous fluid into the space beneath said bottom tray in the operation of said distillation column, a downcomer connected to an opening in the center of said bottom tray for the removal of bottoms product, the top of said downcomer being flush with the upper surface of said bottom tray, and a heat exchange element disposed within said column closely spaced above said bottom tray and between said bottom tray and the tray immediately above said bottom tray, whereby liquid-gas froth maintained on said bottom tray in the operation of said distillation column is adapted to be heated by said heat exchange element.

8. A distillation column for the purification of compounds highly susceptible to polymerization which comprises a multiplicity of trays, a bottom tray and an improved reboiler section in the bottom thereof which comprises as the bottom tray a perforated plate, at least one inlet in the column beneath said bottom tray adapted in the operation of said column for the introduction of gaseous fluid into the space beneath said bottom tray, a downcomer connected to an opening in the center of said bottom tray for the removal of bottoms product, the top of said downcomer being flush with the upper surface of said bottom tray, and an indirect heat exchange tube bundle disposed within and extending across said column at a short distance above said bottom tray and below the next higher tray and adapted for the circulation of hot fluid therethrough so that frothy material agitated by gas passing through said tray is heated thereby in the operation of said column.

References Cited in the file of this patent

UNITED STATES PATENTS

| | | |
|---|---|---|
| 2,237,271 | Dunham | Apr. 1, 1941 |
| 2,534,173 | Kraft | Dec. 12, 1950 |
| 2,568,749 | Kittel | Sept. 25, 1951 |
| 2,581,881 | Pyle | Jan. 8, 1952 |
| 2,611,769 | Hays | Sept. 23, 1952 |
| 2,619,415 | Hemminger | Nov. 25, 1952 |
| 2,722,505 | Faulkner | Nov. 1, 1955 |

FOREIGN PATENTS

| | | |
|---|---|---|
| 100,783 | Switzerland | Aug. 16, 1923 |
| 488,141 | Great Britain | July 1, 1938 |
| 923,423 | France | Nov. 24, 1947 |
| 618,029 | Great Britain | Feb. 15, 1949 |

OTHER REFERENCES

Petr. Proc. 7: 623–627 (June 1952), "Benturi."